Aug. 15, 1950 J. T. BARRON 2,518,516
TRANSMISSION
Filed Oct. 29, 1947
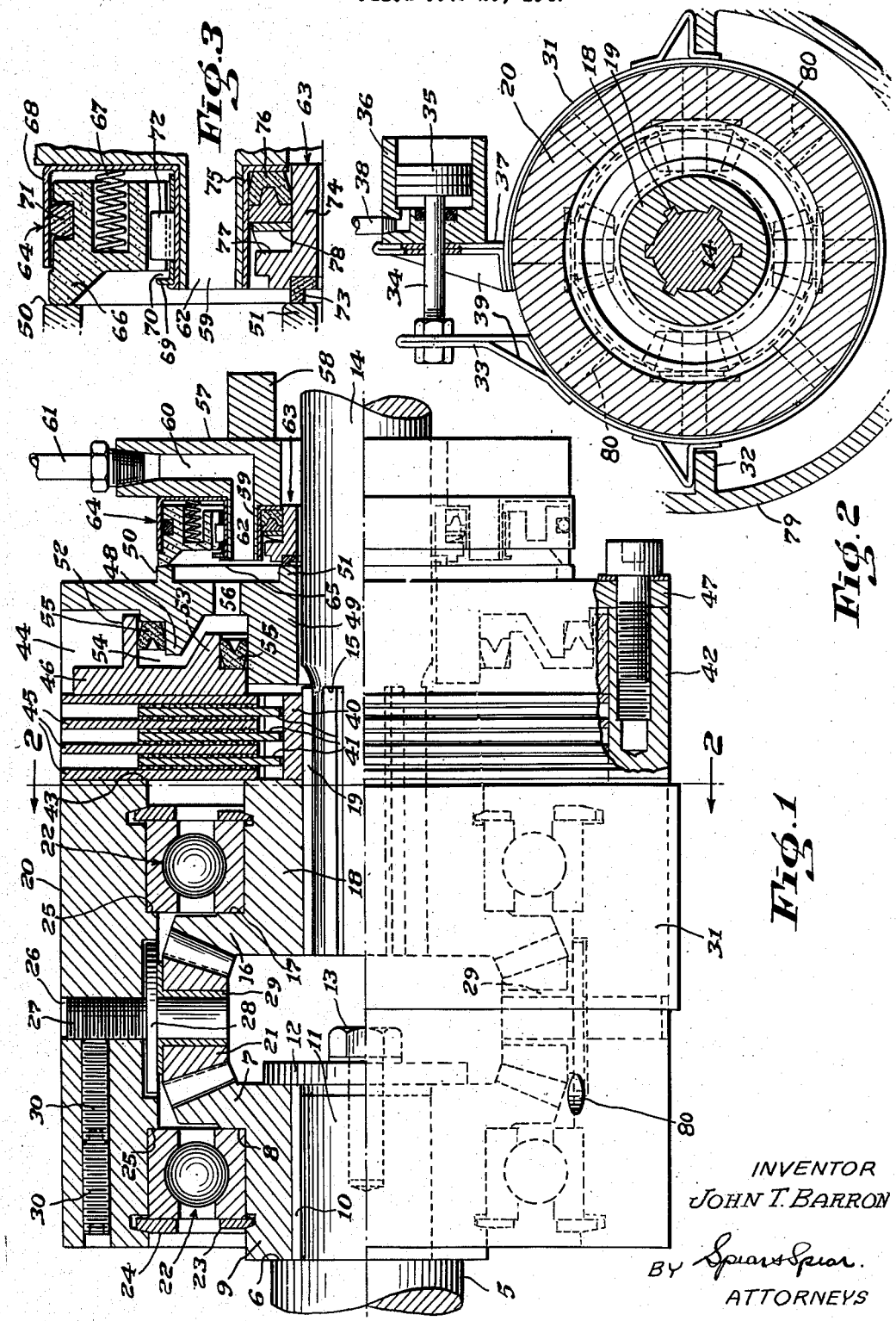
INVENTOR
JOHN T. BARRON
BY Spears Spear.
ATTORNEYS Patented Aug. 15, 1950

2,518,516

UNITED STATES PATENT OFFICE 2,518,516

TRANSMISSION

John T. Barron, South Easton, Mass., assignor to Charles E. Crofoot Gear Corp., South Easton, Mass., a corporation of Massachusetts Application October 29, 1947, Serial No. 782,918

2 Claims. (Cl. 74—780)

My present invention relates to transmissions and particularly to reverse gear units.

For marine uses, a reverse gear unit must be of simple and durable construction and combine ease and reliability with an adequate torque capacity in reverse and a definite neutral position. Many reverse gear units have been proposed, but even those that are in commercial use fail to meet such general requirements.

A transmission to couple axially alined drive and driven elements in accordance with my invention comprises a pair of bevel gears, one of which is anchored to one of the elements and the other of which is keyed to the other of the elements. Each gear includes a shoulder disposed, in an axial direction, opposite to that of the other gear. An open-ended housing for the bevel gears is of sufficient length to overlie a substantial part of the shoulders of the bevel gears. Mounted in the housing are pinions in mesh with the bevel gears and the housing is supported on each bevel gear shoulder by antifriction elements which couple the housing and the unanchored bevel gear against axial movement relative to the anchored bevel gear thereby to maintain proper gear operation.

Where my invention is embodied in a reverse gear unit, reverse drive is established by means of a brake of any desired type which holds the housing against rotation and a clutch adapted to couple the housing and one of the elements together provides a forward drive.

In accordance with my invention, the clutch consists of at least one clutch plate slidably mounted on a spline portion on one of the elements adjacent the extremity of the shoulder of its bevel gear and at least one clutch plate slidably splined to an extension of the housing which overlies the spline portion and establishes, with the housing, a shoulder constituting a backing element. Preferably, that shoulder is disposed so that the extremity of the bevel gear shoulder adjacent the spline portion also constitutes a part of the backing element. The housing extension slidably supports a pressure element under the control of actuating means adapted to cause the clutch plates to be clamped together against the backing element.

While the clutch and brake may be actuated by any means, I prefer that they both be actuated by fluid under pressure to ensure ease of operation and the maintenance of the neutral position.

In the accompanying drawing I have shown, as an illustrative embodiment of my invention, a reverse gear unit from which its novel features and advantages will be readily apparent.

In the drawings:

Fig. 1 is a longitudinal section through the reverse gear unit.

Fig. 2 is a section along the lines 2—2 of Fig. 1, and

Fig. 3 is a fragmentary section, on an enlarged scale, showing the rotary seals.

I have indicated at 5 a drive shaft having a shoulder 6. A bevel gear 7 having a shoulder 8 establishing a hub 9 is keyed as at 10 to the end portion 11 of the shaft 5. The gear 7 is anchored against axial movement relative to the shaft 5 by means of a disc 12 locked to the shaft end 11 by a bolt 13 to seat the extremity of the hub 9 of the bevel gear against the shoulder 6 of the drive shaft. While the bevel gear 7 may be positively anchored to the shaft 5 by other means, the construction shown is simple and has proved effective in use.

At 14, I have indicated a driven shaft axially alined with the shaft 5 and having a shoulder 15. A bevel gear 16 having a shoulder 17 establishing a hub 18 is splined as at 19 to the shaft 14, but is not locked thereto against axial movement.

I provide a housing 20 which is preferably in the form of an open-ended cylinder, the inside diameter of which is slightly greater than the diameter of the bevel gears 7 and 16 and is of sufficient length to overlie their relatively long hubs 9 and 18 which are disposed in opposite directions. The housing 20 supports a plurality of pinions 21 and is in turn supported on the bevel gear hubs by anti-friction elements 22 which are preferably ball bearing units. The races of such units are maintained against axial movement by the wedging action of the retaining rings 23 and 24 positively seating the races of the elements 22 against the shoulders of the bevel gears and the shoulders 25 of the housing 20 respectively.

By this construction, the housing 20 and the unanchored bevel gear 16 are coupled to the anchored bevel gear 7 against axial movement relative thereto thereby to maintain proper gear alinement.

While the pinions 21 may be mounted in any desired way, it is desirable to avoid the necessity of machining the inside diameter of the housing 20 to close tolerances. For that reason, I provide the housing 20 with a plurality of radial bores 26 into which pinion supports 27 are adjustably threaded. Each support 27 has a flange 28 to provide a backing for the bushing 29 for the pinion 21. By this construction, the housing 20 may be inexpensively established and the pinions 21 individually adjusted to provide proper gear alinement. Each support 27 may then be locked in position by any suitable means. To accomplish such locking of each support, I have shown a pair of set screws 30 threaded into one end of the housing 20 in parallel with its axis of rotation to engage with the support. As shown in the drawings, the supports 27 are proportioned so that they do not protrude from the outer surface of the housing 20 in any operative position.

At 31, I have indicated a brake band encircling the housing 20. The brake band 31 is supported at 32 and while it may be positioned operatively by other means, I have shown its upturned end 33 supporting the rod 34 which carries a piston 35 mounted in the cylinder 36 supported on the other upturned end 37 of the brake band 31. The cylinder 36 has a port to which the pressure supply conduit 38 is connected. The brake band ends 33 and 37 are each braced as at 39.

Splined to the shaft 14 between the extremity of the hub 18 of the bevel gear 16 and the shaft shoulder 15 is a gear 40 as a convenient means of providing a splined portion to slidably support a set of clutch plates 41. I form the housing 20 with an extension 42 overlying the gear 40. The extension 42 has a shoulder 43 rearwardly of which it is slotted as at 44 to slidably support a set of clutch plates 45, each of which being spaced from another by one of the clutch plates 41. The shoulder 43 establishes a backing element and is alined with the extremity of the bevel gear hub 18 so that the hub 18 also constitutes a part of the backing element.

The slots 44 also slidably support a pressure plate 46. I have shown the pressure plate 46 as actuated by fluid under pressure to clamp the clutch plates together against the backing element. To accomplish this, I bolt to the end of the housing extension 42, an end plate 47 having a pair of annular extensions 48 and 49 disposed towards the pressure plate 46 and a pair of annular extensions 50 and 51 disposed in the opposite direction. The pressure plate 46 has a pair of annular flanges 52 and 53 which define with the extensions 48 and 49 a chamber 54 and which carry suitable annular seals 55 to seal the chamber 54 throughout the relatively short stroke of the pressure plate 46. The end plate 47 has at least one port 56 located between the extensions 50 and 51.

At 57, I have shown a holder surrounding the driven shaft 14 and held against rotation by a support indicated at 58. The holder has an annular extension 59 disposed towards the plate 47 and is provided with a radial passage 60 to which a pressure supply conduit indicated at 61 is connected. The extension 59 has a port 62 in communication with the passage 60 located between the extensions 50 and 51 of the plate 47.

Rotary seals, generally indicated at 63 and 64, are seated on the inner and outer surfaces, respectively, of the annular extension 59 and are in engagement with the annular extensions 51 and 50, respectively, to establish a pressure chamber 65.

The seal 64 (see Fig. 3) includes an annular contact 66 yieldably maintained against the annular extension 50 by means of springs 67 seated on the seal carrier 68 with reference to which the contact 66 is slidable and which is substantially U-shaped in cross section. A ring 69 is a press fit on the inner part of the carrier 68 and defines with the contact 66 an oil passage 70 which effects communication between the chamber 65 and the rear end of the contact 66 so that fluid pressure in the chamber 65 is available to urge the contact 66 against the extension 50. For that reason, a seal 71, preferably of the O-ring type, is disposed between the contact 66 and its carrier 68. The carrier 68 and the ring 69 are keyed together as at 72.

The rotary seal 63, while it may be of the same construction as the seal 64, is shown as comprising a contact 73 carried on an annular support 74 between which and the annular ring 75 on the extension 59 is a seal 76. The support 74 has a shoulder 77 between which and the seal 76 is a spring 78 urging the contact 73 against the extension 51 and which is positioned relative to the extension 59 to enable fluid pressure to enter in back of the shoulder 77 so that fluid pressure is available to assist in maintaining the rotary seal 63 operative with respect to the extension 51.

It will be understood that the transmission shown to illustrate my invention is itself housed to provide an oil reservoir such as I have indicated at 79 holding a much greater volume of oil than could be contained in the housing 20. To ensure the circulation of oil in the reservoir 79 through the transmission and particularly through the meshed bevel and pinion gears, I provide the housing 20 with a plurality of holes 80 preferably located between the shoulders 25. Because of the gear train which I use, a definite oil circulation is established when the transmission is in reverse drive and the housing 20 is held against rotation. The positive circulation of oil through the housing 20 is also important in that it prevents the accumulation of sludge therein.

From the foregoing, it will be apparent that the reverse gear units in accordance with my invention are simple and compact in construction and are adapted to give long and efficient service because the housing 20 and the bevel gear 16 are positively located with reference to the anchored bevel gear 1.

While neither the brake nor the clutch need be operated by fluid pressure, such operation is preferred. In addition to smooth and proper brake and clutch operation which fluid pressure ensures, it eliminates mechanical brake and clutch operating mechanisms which are objectionable in construction because of expense and the necessity of providing for their adjustment and in operation because of drag. Such drag causes partial shaft rotation when the control means are neutrally positioned with resulting heating which causes wear.

What I therefore claim and desire to secure by Letters Patent is:

1. A reverse gear unit to connect first and second shafts, said unit comprising first and second bevel gears, each one of which includes a shouldered hub having a splineway to enable it to be connected to one of the shafts, means attachable to said first shaft to lock the gear splined thereto against axial movement, a unitary open-ended cylindrical housing enclosing said bevel gears, a pinion rotatably supported by said housing and in mesh with said bevel gears, said housing being of sufficient length to overlie a substantial part of both hubs and having each of its ends counter-bored to provide a shoulder radially alined with the shoulder of one of the bevel gear hubs, a bearing unit interposed between each hub and the counterbored housing ends, and means anchoring said bearing units against said radially alined shoulders thereby to position said second bevel gear against axial movement relative to said first shaft.

2. A reverse gear unit adapted to connect a driving shaft to a driven shaft comprising a unitary, hollow, open-ended, cylindrical housing having substantially the same diameter throughout its length, a pinion gear rotatably mounted in said housing intermediate its ends, a driving gear having a hub adapted to be coupled to said driving shaft located in one end of said housing and meshed with said pinion, a driven gear having a hub adapted to be coupled to said driven shaft located in the other end of said housing and meshed with said pinion, means to lock one of said gears to its shaft to prevent axial movement therebetween, means to rotatably mount said driving and driven gears in said housing and to maintain them in mesh with said pinion comprising a counterbore in each end of said housing providing a gear locating shoulder adjacent each end thereof, a thrust shoulder on each of said hubs and radially alined with its respective gear locating shoulder, a thrust bearing in each of said counterbores, and means for anchoring each thrust bearing against the bearing locating shoulder in its counterbore and against the thrust shoulder on its gear.

JOHN T. BARRON.

REFERENCES CITED

The following references are of record in the file of this patent:

UNITED STATES PATENTS

| Number | Name | Date |
| --- | --- | --- |
| 707,396 | Darling et al. | Aug. 19, 1902 |
| 954,169 | Clarke | Apr. 5, 1910 |
| 1,663,838 | Harmon | Mar. 27, 1928 |
| 2,009,191 | Buckles | July 23, 1935 |
| 2,018,014 | Fahrney | Oct. 22, 1935 |
| 2,189,109 | Hacker | Feb. 6, 1940 |